(No Model.)
R. T. HOFFMAN.
PLANT OR TREE SUPPORTER.
No. 469,246. Patented Feb. 23, 1892.
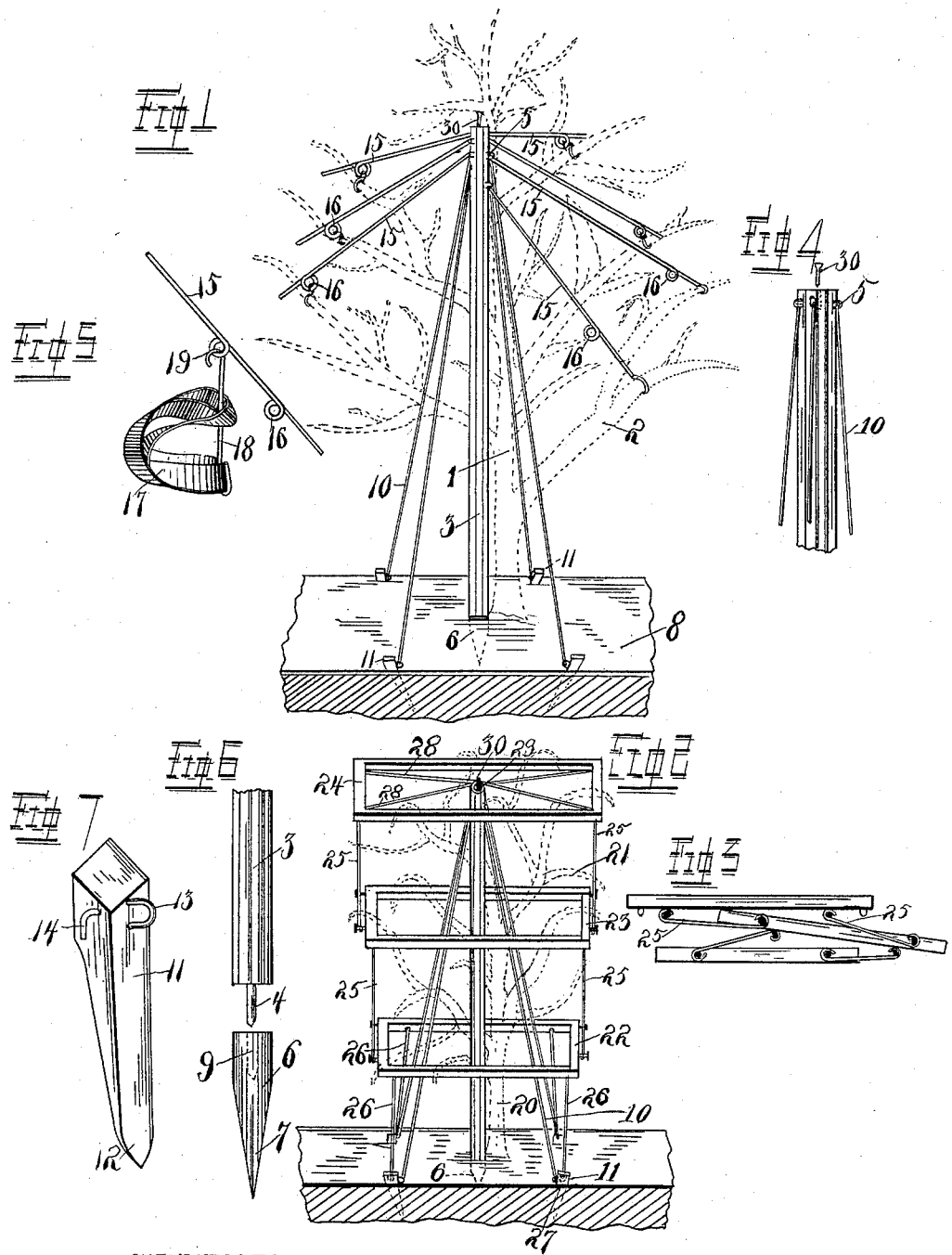
WITNESSES
A. A. Eicks
Ed. F. Longan
INVENTOR
R. T. Hoffman
Higdon & Higdon, Attorneys

UNITED STATES PATENT OFFICE.

RUTLEDGE T. HOFFMAN, OF ST. LOUIS, MISSOURI, ASSIGNOR TO SUSAN SMITH, OF LITTLE ROCK, ARKANSAS.

PLANT OR TREE SUPPORTER.

SPECIFICATION forming part of Letters Patent No. 469,246, dated February 23, 1892.

Application filed August 10, 1891. Serial No. 402,279. (No model.)

*To all whom it may concern:*

Be it known that I, RUTLEDGE T. HOFFMAN, of the city of St. Louis and State of Missouri, have invented certain new and useful Improvements in Devices for Supporting Plants, such as Tomatoes, or Limbs of Fruit and other Trees, of which the following is a full, clear, and exact description, reference being had to the accompanying drawings, forming a part hereof.

My invention relates to improvements in devices for supporting plants, such as tomatoes, and limbs of fruit and other trees; and it consists in the novel arrangement and combination of parts, as will be more fully hereinafter described, and designated in the claims.

In the drawings, Figure 1 shows my invention or part of the same applied or used for supporting the limbs of fruit-trees. Fig. 2 shows my complete invention applied to and in use for supporting a plant, such as tomato-plants, &c. Fig. 3 also shows a part of my invention folded up when not in use. Fig. 4 is a similar view of a part of my invention folded up when not in use. Fig. 5 is a perspective view of a canvas loop, wire, and hook for securing the limbs or twigs of the fruit-tree to the supporting-wire in a manner as will be more specifically hereinafter described. Fig. 6 is a side elevation of a foundation-block and also the center supporting-post with parts broken away. Fig. 7 is a perspective view of a stake which I employ in carrying out my invention.

The object of my invention is to construct a device for supporting tomato and other fruit plants of like character, and also the limbs and twigs of fruit and other varieties of trees. The nature and object of my invention can be readily perceived by referring to Figs. 1 and 2 of said drawings, wherein the application of the same is illustrated.

Referring to the drawings, and especially to Fig. 1, wherein my invention is shown as applied to a fruit-tree, 1 indicates said fruit-tree, which is shown in dotted lines, and 2 is the limb of same.

3 indicates a center supporting-post, which is provided at its lower end with a peg or pin 4 and at its upper terminal portion with a series of staples 5.

6 indicates the foundation-plug or stake, which has a tapering or attenuated end 7, so that the same may be easily driven into the ground. Said stake 6 is driven in the ground 8 adjacent to the body of the tree and remains there permanently. Said stake 6 is provided in its upper or blunt end with a hole 9, as shown in dotted lines in Fig. 6, and in said hole 9 the pin 4 is adapted to be inserted, which will prevent the lower end of post 3 from slipping off of the stake 6.

Pivotally secured in the staples 5 are a series of sustaining-wires 10, which are employed for holding the post 3 in an upright and stable position, in a manner as I will now proceed to describe. Pivotally secured to the sustaining-wires 10 and at the lower ends thereof are stakes 11, provided with sharpened ends 12, with staples or eyelets 13, and with hooks 14. Said stakes 11 are driven in the ground, as illustrated in Fig. 1, and, in connection with the sustaining-wires 10, hold the center pole or post 3 in an upright and stable position, as before stated. Pivotally secured to the upper terminal portion of the post 3 in any suitable and mechanical manner, preferably, however, as illustrated in the drawings, are a series of limb-supporting wires 15, the same being provided at suitable intervals of their lengths with a series of eyelets 16 for the purpose hereinafter set forth. Said eyelets 16 of the limb-supporting wires 15 are preferably formed by bending the wires 15 into loops or forming loops therein at certain intervals of their lengths.

17 indicates a canvas loop or a loop made of canvas or any other soft pliable material, and to said loop a wire 18, provided with a hook 19, is secured in any suitable manner. The loop 17, when made, is nothing more than a band, and when applied to the limb of the tree is folded, and this wire 18 passes through, as illustrated in Fig. 5; or, in other words, the loop is folded around the limb and then the wire 18 is passed therethrough, as illustrated in Fig. 5, and the hook 19 of said wire 18 is hooked into eyelet 16, as illustrated in Fig. 5.

I employ the loop 17 in connection with the wire 18 and hook 19 formed thereon for securing the limbs 2 of the tree to the limb-supporting wires 15.

Having described the part of my invention as applied to a fruit-tree, I will now describe my complete invention as applied to a tomato-plant, referring to Fig. 2 for illustration, wherein 20 indicates the tomato-plant (illustrated in dotted lines) and 21 the branches of same.

When I desire to use my invention for supporting tomato-plants and other plants of similar character, I use the same center post 3, supporting-stake 6, stakes 11, and sustaining-wires 10, as has been heretofore set forth in the description of the parts of my invention when applied to a fruit-tree, and in addition to said described parts, as above stated, I employ frames 22, 23, and 24. (See Fig. 2.) Said frames are of unequal dimensions, the frame 22 being smaller than either of the frames 23 or 24 and the frame 23 being smaller than frame 24. Said frames 22, 23, and 24 are pivotally secured together by means of wires 25 in any suitable and mechanical manner, and may be placed together when not in use, as illustrated in Fig. 3, which illustrates a side elevation of the frames folded. Pivotally secured to the frame 22, or the smaller of said frames, are wires 26, the same being provided at the lower ends with eyelets 27, as shown in dotted lines in Fig. 2, which are adapted to pass over the hooks 14 of stakes 11.

28 indicates wires which pass diagonally across and the ends whereof are secured to the frame-work 24. Said wires 28 are provided in the region of their central portions with eyelets 29, which coincide with each other. Said eyelets 29 are formed by the wires 28 being looped. The frame-work 23, 24, and 25 is placed over the center posts 3 and sustaining-wires 10, and the wires 28 rest over and are supported upon the top of the center post 3. Said wires are held in said position by means of a pin or nail 30, which passes through the eyelets 29 and into the center post 3, as illustrated in Fig. 2. Said pin or nail 30, however, is removable. In other words, the frames 22, 23, and 24 are placed over the center post 3 and sustaining-wires 10, and are held in said position by means of the nail or pin 30 and the wires 26, the eyelets 27 whereof are passed over the hooks 14 of the stakes 11. The smallest frame 22, as can be readily perceived by referring to Fig. 2, occupies the lowest position when I use my invention for supporting the branches of tomato-plants or similar varieties. The frames 23 and 24 are larger and of course afford more room for the large branches of the plant which occupy positions near the top of the plant. The branches 21 of the plant pass upwardly in the frame-work 22, 23, and 24, and whenever they become heavily laden with fruit they can fall over and rest upon said frame-work, as illustrated in Fig. 2, and consequently the fruit will not come in contact with the ground and become injured, as is frequently the case when the branches are not supported.

Having fully described my invention, what I claim is—

1. The herein-described device for supporting plants or the limbs of fruit-trees, comprising a center supporting-pole 3, provided with a pin or peg 4, a stake 6, provided with a sharpened end 7 and with a hole 9, adapted to receive the pin 4, a series of sustaining-wires 10, pivotally secured near the upper end of the pole, stakes 11, provided with means for attaching the lower ends of the wires 10 thereto, and a suitable device for supporting the limbs of plants or trees, substantially as set forth.

2. The herein-described device for supporting the branches of plants, comprising a center pole 3, provided at its lower end with a pin or peg 4 and at its upper end with a hole, a stake 6, provided with a sharpened end 7 and with a hole 9, in which peg 4 is adapted to be inserted a series of sustaining-wires 10, pivotally secured to said pole, stake 11, provided with staples 13 and hooks 14, secured to said sustaining-wires 10 and adapted to be driven in the ground for holding said center post in an upright and stable position, frames 22, 23, and 24, the same being pivotally secured together and mounted over said center pole and sustaining-wires 10, diagonal wires 28, secured to frame-work 24 for supporting the same on the center post, and wires 26 for securing the frame 22 to the stakes 11, substantially as set forth.

3. In a device for supporting plants, a supporting pole or post, frames 22, 23, and 24, of unequal sizes, diagonal wires 28, secured to frame-work 24 and provided with coincident eyelets 29, adapted to take over a suitable projection on the post, and wires 26 for securing the frame-work 22 to the ground or any other support, substantially as set forth.

4. In a device for supporting plants, frames 22, 23, and 24, of unequal sizes, pivotally secured together by means of wires 25, diagonal wires 28, provided with coincident eyelets 29, secured to said frame-work 24 for supporting the same, wires 26, provided with eyelets 27, pivotally secured to frame-work 22, and stakes 11, provided with hooks 14, over which eyelets 27 may be passed, substantially as set forth.

5. In a device for supporting the limbs of plants or trees, the combination of a suitable support and a series of connected frames of unequal sizes supported thereon and arranged so as to gradually increase in size from the bottom upward, substantially as shown and described.

In testimony whereof I affix my signature in presence of two witnesses.

RUTLEDGE T. HOFFMAN.

Witnesses:
 ED. E. LONGAN,
 ALFRED A. EICKS.